United States Patent
Phillips et al.

(10) Patent No.: US 9,621,259 B2
(45) Date of Patent: Apr. 11, 2017

(54) AD HOC CONFIGURABLE TDMA DATALINK

(75) Inventors: David W. Phillips, Cedar Rapids, IA (US); James H. Sabin, Mt. Vernon, IA (US); Kevin M. Bayer, Cedar Rapids, IA (US); Gary V. Barnette, Anamosa, IA (US); Steven V. Schatz, Cedar Rapids, IA (US); Logan A. Loeb, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 542 days.

(21) Appl. No.: 13/475,307

(22) Filed: May 18, 2012

(65) Prior Publication Data

US 2013/0308624 A1 Nov. 21, 2013

(51) Int. Cl.
| | |
|---|---|
| *H04H 20/71* | (2008.01) |
| *H04B 7/26* | (2006.01) |
| *H04W 28/18* | (2009.01) |
| *H04W 84/06* | (2009.01) |
| *H04W 84/18* | (2009.01) |

(52) U.S. Cl.
CPC ............ *H04B 7/2656* (2013.01); *H04W 28/18* (2013.01); *H04W 84/06* (2013.01); *H04W 84/18* (2013.01)

(58) Field of Classification Search
USPC .................................................. 370/310–350
See application file for complete search history.

(56) References Cited

U.S. PATENT DOCUMENTS

| | | | | |
|---|---|---|---|---|
| 5,798,726 A | * | 8/1998 | Schuchman | G08G 5/0013 342/32 |
| 6,067,294 A | | 5/2000 | Kubo et al. | |
| 6,285,892 B1 | * | 9/2001 | Hulyalkar | ...................... 455/574 |
| 6,771,625 B1 | | 8/2004 | Beal | |
| 7,944,905 B2 | * | 5/2011 | Joshi | ...................... H04W 64/00 370/328 |
| 8,059,624 B2 | * | 11/2011 | Kwon | ............................ 370/340 |
| 8,271,627 B2 | * | 9/2012 | Cho et al. | ..................... 709/221 |
| 8,503,328 B2 | * | 8/2013 | Tian | ....................... H04W 48/12 370/254 |
| 2002/0018458 A1 | * | 2/2002 | Aiello | ............... H04W 56/0015 370/348 |
| 2002/0071413 A1 | * | 6/2002 | Choi | ...................... H04W 74/02 370/337 |
| 2002/0105970 A1 | * | 8/2002 | Shvodian | ............... H04W 16/14 370/468 |
| 2003/0063619 A1 | * | 4/2003 | Montano | ........... H04L 29/12009 370/443 |
| 2004/0253996 A1 | * | 12/2004 | Chen | ................. H04W 52/0216 455/574 |

(Continued)

*Primary Examiner* — Candal Elpenord
*Assistant Examiner* — Juvena Loo
(74) *Attorney, Agent, or Firm* — Angel N. Gerdzhikov; Donna P. Suchy; Daniel M. Barbieri

(57) ABSTRACT

A method and system for providing configuration parameters to TDMA nodes are disclosed. The configuration parameters are repeatedly transmitted to the TDMA nodes in a predetermined fashion, allowing existing nodes to receive the up-to-date configuration parameters from messages being broadcast in the TDMA network. Any new node joining the TDMA network may also receive the up-to-date configuration parameters, allowing the new node to apply such parameters accordingly and join the network as applicable.

17 Claims, 4 Drawing Sheets

(56) References Cited

U.S. PATENT DOCUMENTS

| | | | |
|---|---|---|---|
| 2004/0264428 A1* | 12/2004 | Choi | H04W 48/08 370/338 |
| 2006/0198346 A1 | 9/2006 | Liu et al. | |
| 2007/0135150 A1 | 6/2007 | Ushiki et al. | |
| 2008/0095103 A1* | 4/2008 | Goodjohn | 370/329 |
| 2008/0310390 A1 | 12/2008 | Pun et al. | |
| 2009/0213782 A1 | 8/2009 | Yee et al. | |
| 2010/0205283 A1* | 8/2010 | Cho | H04W 48/12 709/221 |
| 2012/0044827 A1* | 2/2012 | In | H04W 56/0075 370/252 |
| 2013/0039350 A1* | 2/2013 | Bhatia | H04W 48/12 370/336 |

* cited by examiner

AD HOC CONFIGURABLE TDMA DATALINK

TECHNICAL FIELD

The present disclosure relates generally to communication systems, and more particularly to a Time Division Multiple Access (TDMA) communication system.

BACKGROUND

Time Division Multiple Access (TDMA) is a channel access method for shared medium networks. TDMA allows several users to share the same frequency channel by dividing a data stream into frames and further dividing the frames into time slots. Various systems may utilize TDMA to facilitate communications. Such systems may include, for example, cellular systems, satellite communication systems, combat-net radio systems, aircraft landing systems (e.g., the Joint Precision Approach and Landing System, or JPALS) and the like.

Typically in a TDMA network, all participating nodes (e.g., radios, transmitters, receivers or the like) need to have knowledge of configuration parameters. Such parameters may include, for example, function of network controller, data rates, TDMA assignments and the like. Whenever a configuration parameter is modified for the TDMA network, a software load or system update is required for all participating nodes. However, updating fielded/remote nodes/equipment is logistically difficult, costly, and overall undesirable as a long term solution.

Therein lies a need for a method and system for providing configuration parameters to TDMA nodes, without the aforementioned shortcomings.

SUMMARY

The present disclosure is directed to a TDMA communication system. The system may include a controller configured for repeatedly broadcasting TDMA configuration data on a data stream according to a predetermined schedule. The TDMA communication system may also include one or more node in communication with the controller. Each node may be configured for: receiving the TDMA configuration data from the data stream; determining whether the TDMA configuration data received from the data stream is different than the TDMA configuration data being utilized by said at least one node; and updating the TDMA configuration data being utilized by said at least one node based on the TDMA configuration data received from the data stream.

Another embodiment of the present disclosure is directed to a method for configuring TDMA configuration data in at least one node in a TDMA communication system. The method may include receiving the TDMA configuration data being broadcasted on a data stream according to a predetermined schedule; determining whether the TDMA configuration data received from the data stream is different than the TDMA configuration data being utilized by said at least one node; and updating the TDMA configuration data being utilized by said at least one node based on the TDMA configuration data received from the data stream.

A further embodiment of the present disclosure is directed to a method for providing TDMA configuration data to at least one node in a TDMA communication system. The method may include specifying a TDMA configuration data broadcasting schedule, the broadcasting schedule is configured to broadcast TDMA configuration data in at least one predetermined time slot in every predetermined number of frames; allocating time slots on a data stream according to the specified broadcasting schedule; and repeatedly broadcasting TDMA configuration data on the data stream in the allocated time slots.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Figure 1:
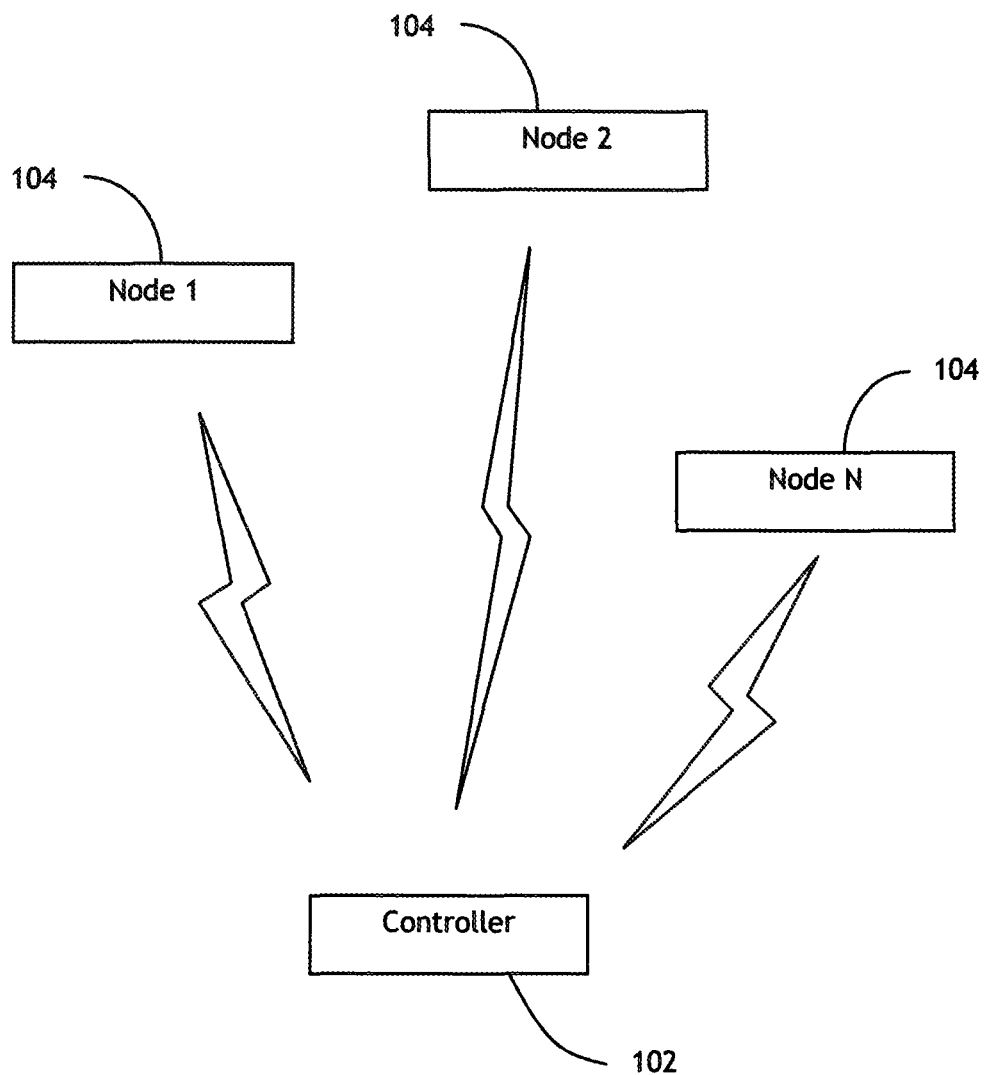
FIG. 1 is an illustration depicting a TDMA communication system.

Referring to FIG. 1, an illustration depicting a TDMA communication system is shown. The TDMA communication system may include a controller 102 and one or more node 104 in communication with the controller 102. The present disclosure is directed to a method and system for providing configuration parameters to the nodes 104. In accordance with the present disclosure, the configuration parameters are repeatedly transmitted in a predetermined fashion, allowing existing nodes to receive the up-to-date configuration parameters from messages being broadcast in the TDMA network. Any new node joining the TDMA network may also receive the up-to-date configuration parameters, allowing the new node to apply such parameters accordingly and join the network as applicable.

Figure 2:
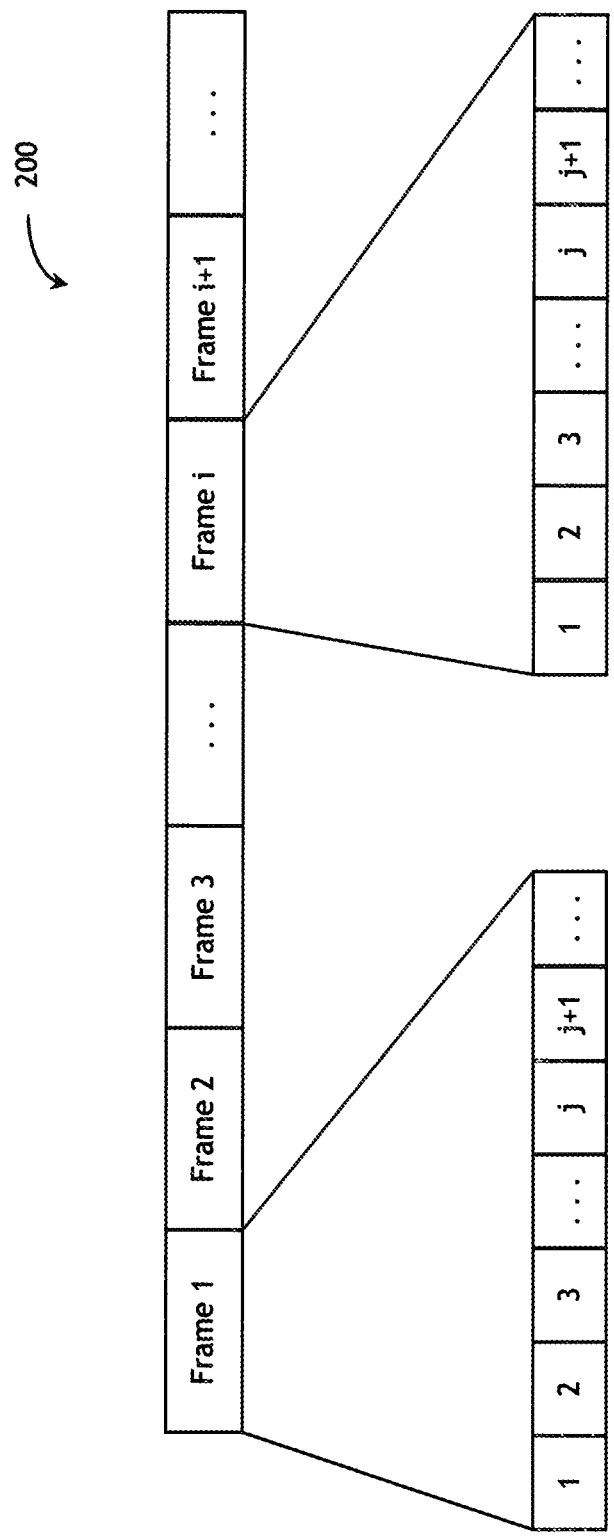
FIG. 2 is an illustration depicting a TDMA data stream.

In one embodiment, the configuration parameters are transmitted at the same time slot in every frame. As depicted in FIG. 2, the data stream 200 is divided into multiple frames, and each frame is further divided into multiple time slots. According to an exemplary implementation of the present disclosure, the $j^{th}$ time slot in each frame may be utilized to transmit the TDMA configuration parameters. This allows any node, whether it is an existing node in the TDMA network or a new node joining the TDMA network, to receive the configuration parameters and apply such parameters accordingly.

It is contemplated, however, that the configuration parameters may take more than a single time slot to be fully transmitted. Several approaches may be utilized to address this issue. For instance, the $j^{th}$ time slot in each frame may be utilized to transmit a portion of the TDMA configuration parameters. That is, the $j^{th}$ time slot in frame i may contain the first portion of the TDMA configuration parameters, the $j^{th}$ time slot in frame i+1 may contain the next portion of the TDMA configuration parameters and so on. After all of the TDMA configuration parameters have been transmitted sequentially in this manner, the $j^{th}$ time slot in the next frame may repeat from the first portion of the TDMA configuration parameters again in the same predetermined fashion. Alternatively, instead of spanning through multiple frames as described above, two or more time slots (e.g., slots j through j+n) in each frame may be utilized to transmit the TDMA configuration parameters.

In addition, it is contemplated that the configuration parameters are not required to be transmitted in every frame. For instance, the TDMA configuration parameters may be transmitted in the $j^{th}$ time slot in every other frame, or every predetermined number of frames in general. Therefore, it is understood that the approaches described above are merely exemplary. The TDMA configuration parameters may be transmitted in various other ways without departing from the spirit and scope of the present disclosure, as long as the transmission is carried out in a predetermined fashion.

Figure 3:
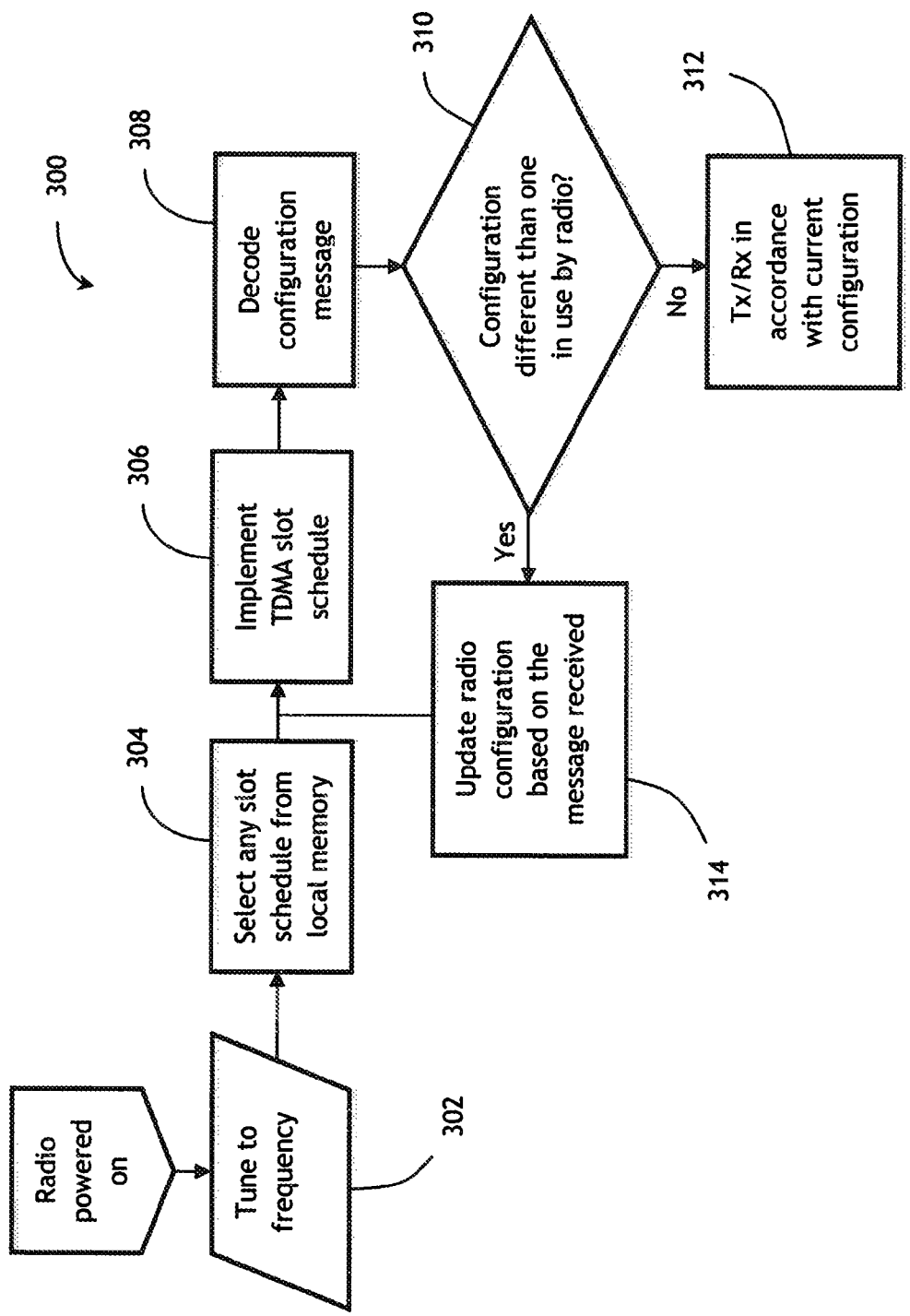
FIG. 3 is a flow diagram depicting the process flow of a participating node receiving configuration data broadcast on a TDMA communication system.

Referring to FIG. 3, a flow diagram 300 depicting the process flow of a participating node joining a TDMA network is shown. The node may tune to the particular frequency of the TDMA network in step 302. The node may then select any slot schedule from it local memory in step 304 and implement the TDMA slot schedule in step 306. As previously described, the node may then start receiving the TDMA configuration data being broadcasted on the data stream according to the predetermined schedule. Upon receiving the TDMA configuration data, the node may decode the received configuration data in step 308 and compare the received configuration data against the configuration data currently utilized by the node in step 310. If the received configuration data matches the configuration data currently utilized by the node, no further configuration is needed, and the node may start transmitting/receiving data in accordance with the current configuration as indicated in step 312. On the other hand, if the received configuration data is different from the configuration data currently utilized by the node, the node may update its configuration in step 314 and repeat the process from step 306.

Figure 4:
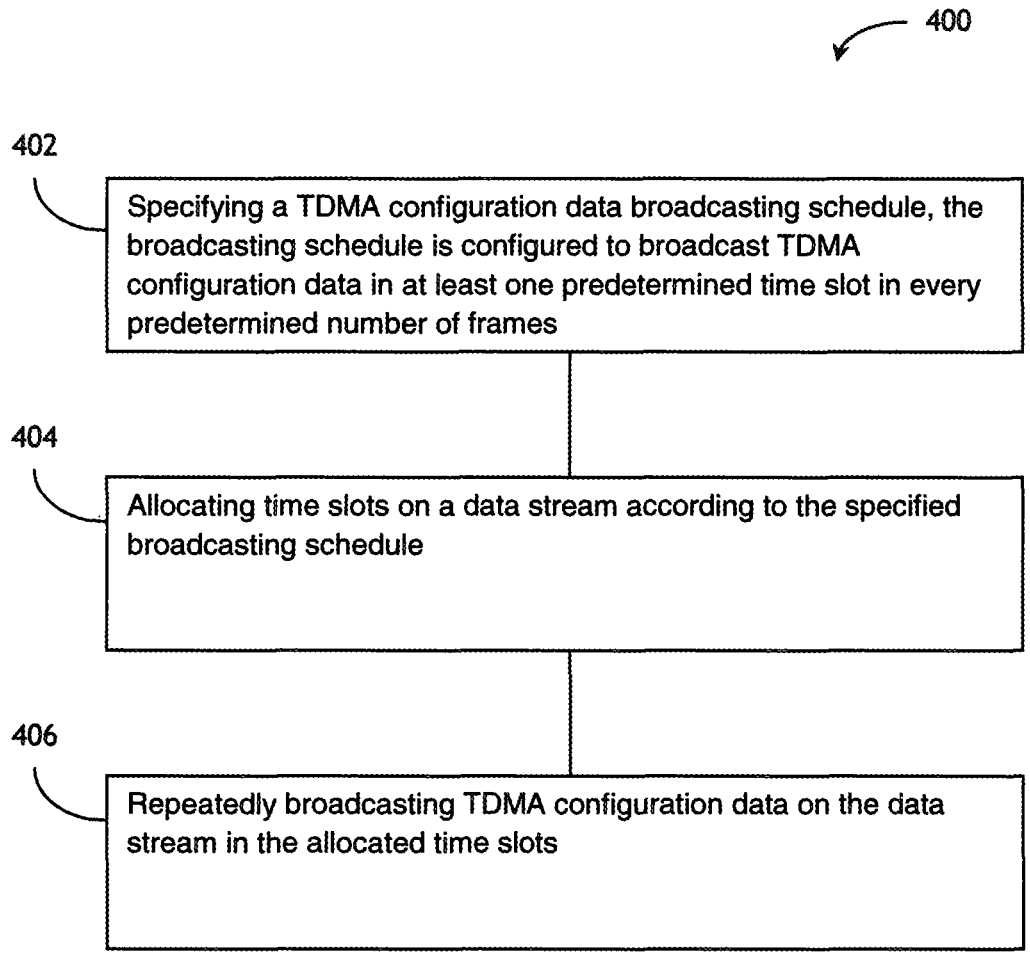
FIG. 4 is a flow diagram depicting a method for providing TDMA configuration data to one or more participating nodes in a TDMA communication system.

Referring to FIG. 4, a flow diagram 400 depicting a method for providing TDMA configuration data to one or more participating nodes in a TDMA communication system is shown. Step 402 may specify a configuration data broadcasting schedule. As described above, the broadcasting schedule is configured to broadcast TDMA configuration data in at least one predetermined time slot in every predetermined number of frames. Step 404 may allocate time slots on a data stream according to the specified broadcasting schedule. The TDMA controller may then repeatedly broadcast/transmit TDMA configuration data on the data stream in the allocated time slots, as illustrated in step 406, allowing the one or more nodes to receive the up-to-date configuration parameters from the broadcast. It is contemplated that the method 400 may be performed by any device in the TDMA communication system that is in charge of communicating configuration parameters to the participating nodes. For instance, a TDMA controller may be configured to carry out the steps of method 400.

It is contemplated that method and system in accordance with the present disclosure may be utilized in various TDMA communication systems. For example, aircraft landing systems such as the Joint Precision Approach and Landing System (JPALS) is designed to meet specific requirements while retaining some flexibility in how the TDMA structure is assigned. Currently there are several TDMA structures defined but each must be part of the hard coded software load for a radio to use. The method and system in accordance with the present disclosure may satisfy the JPALS requirements while permitting TDMA changes without changing radio software.

In one embodiment, the configuration parameters transmitted utilizing the method and system in accordance with the present disclosure may include overall schedule settings such as assigned index values, maximum bandwidth and the like. TDMA Slot specific information such as message type identifier, slot start time, data rate, anti-jam technique or the like may also be include as part of the configuration parameters. In addition, in certain implementations where each frame only transmits a portion of the configuration parameters (as previously described), a fragment identifier may be included with each message since it will take multiple frames to transmit the entire configuration data.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A Time Division Multiple Access (TDMA) communication system, comprising:
    a controller configured for repeatedly broadcasting TDMA configuration data in at least one predetermined time slot on a data stream every predetermined number of frames according to a predetermined schedule, wherein the TDMA configuration data includes at least one of: a maximum bandwidth parameter of the TDMA communication system, a TDMA slot start time parameter, and a data rate parameter of the TDMA communication system;

at least one node in communication with the controller, said at least one node configured for:
- selecting a TDMA slot schedule from a local memory of the at least one node and implementing the TDMA slot schedule prior to receiving the TDMA configuration data from the data stream;
- receiving the TDMA configuration data from the data stream;
- determining whether the TDMA configuration data received from the data stream is different than the TDMA configuration data being utilized by said at least one node; and
- updating the TDMA configuration data being utilized by said at least one node based on the TDMA configuration data received from the data stream.

2. The TDMA communication system of claim 1, wherein the predetermined schedule is to broadcast TDMA configuration data in a predetermined time slot in every frame.

3. The TDMA communication system of claim 1, wherein the predetermined schedule is configurable.

4. The TDMA communication system of claim 1, wherein said at least one node is configured for repeatedly receiving the TDMA configuration data according to the predetermined schedule.

5. The TDMA communication system of claim 1, wherein said at least one node is configured for continue utilizing the TDMA configuration data being utilized by said at least one node when the TDMA configuration data received from the data stream is not different than the TDMA configuration data being utilized by said at least one node.

6. The TDMA communication system of claim 1, wherein the TDMA communication system is adapted for servicing a Joint Precision Approach and Landing System (JPALS).

7. A method for configuring Time Division Multiple Access (TDMA) configuration data in at least one node in a TDMA communication system, the method comprising:
- selecting a TDMA slot schedule from a local memory of the at least one node and implementing the TDMA slot schedule prior to receiving the TDMA configuration data being broadcasted;
- receiving the TDMA configuration data being broadcasted in at least one predetermined time slot on a data stream every predetermined number of frames according to a predetermined schedule, wherein the TDMA configuration data includes at least one of: a maximum bandwidth parameter of the TDMA communication system, a TDMA slot start time parameter, and a data rate parameter of the TDMA communication system;
- determining whether the TDMA configuration data received from the data stream is different than the TDMA configuration data being utilized by said at least one node; and
- updating the TDMA configuration data being utilized by said at least one node based on the TDMA configuration data received from the data stream.

8. The method of claim 7, wherein the predetermined schedule is to receive TDMA configuration data in a predetermined time slot in every frame.

9. The method of claim 7, wherein the predetermined schedule is configurable.

10. The method of claim 7, wherein said at least one node is configured for repeatedly receiving the TDMA configuration data according to the predetermined schedule.

11. The method of claim 7, wherein said at least one node is configured for continue utilizing the TDMA configuration data being utilized by said at least one node when the TDMA configuration data received from the data stream is not different than the TDMA configuration data being utilized by said at least one node.

12. The method of claim 7, wherein the TDMA communication system is adapted for servicing a Joint Precision Approach and Landing System (JPALS).

13. A method for providing Time Division Multiple Access (TDMA) configuration data to at least one node in a TDMA communication system, the method comprising:
- specifying a TDMA configuration data broadcasting schedule, the broadcasting schedule is configured to broadcast TDMA configuration data in at least one predetermined time slot in every predetermined number of frames;
- allocating time slots on a data stream according to the specified broadcasting schedule; and
- repeatedly broadcasting the TDMA configuration data on the data stream in the allocated time slots, wherein the TDMA configuration data includes at least one of: a maximum bandwidth parameter of the TDMA communication system, a TDMA slot start time parameter, and a data rate parameter of the TDMA communication system, and wherein said at least one node is configured to select a TDMA slot schedule from a local memory of the at least one node and implement the TDMA slot schedule prior to receiving the TDMA configuration data from the data stream.

14. The method of claim 13, wherein the broadcasting schedule is to broadcast TDMA configuration data in a predetermined time slot in every frame.

15. The method of claim 13, wherein the broadcasting schedule is configurable.

16. The method of claim 13, wherein the TDMA configuration data is divided into a plurality of data portions, and the plurality of data portions is broadcasted sequentially according to the specified broadcasting schedule.

17. The method of claim 13, wherein the TDMA communication system is adapted for servicing a Joint Precision Approach and Landing System (JPALS).

* * * * *